US009699969B2

(12) United States Patent
Bonzo et al.

(10) Patent No.: US 9,699,969 B2
(45) Date of Patent: Jul. 11, 2017

(54) PORTABLE HOPS HARVESTER

(71) Applicant: Hopsharvester LLC, Honeoye Falls, NY (US)

(72) Inventors: John Bonzo, Honeoye Falls, NY (US); Jeffrey Heintz, Rochester, NY (US)

(73) Assignee: Hopsharvester, LLC, Honeoye Falls, NY (US)

( * ) Notice: Subject to any disclaimer, the term of this patent is extended or adjusted under 35 U.S.C. 154(b) by 0 days.

(21) Appl. No.: 15/093,794

(22) Filed: Apr. 8, 2016

(65) Prior Publication Data

US 2016/0330908 A1    Nov. 17, 2016

Related U.S. Application Data

(60) Provisional application No. 62/145,252, filed on Apr. 9, 2015, provisional application No. 62/168,201, filed on May 29, 2015.

(51) Int. Cl.
*A01D 46/02* (2006.01)

(52) U.S. Cl.
CPC .................... *A01D 46/02* (2013.01)

(58) Field of Classification Search
CPC ........ A01D 45/00; A01D 46/00; A01D 46/02; A01D 46/20; A01D 46/28
USPC ....... 56/10.7, 14.5, 130, 330; 182/69.6, 129, 182/141; 460/123, 126, 129
See application file for complete search history.

(56) References Cited

U.S. PATENT DOCUMENTS

| 563,504 | A | | 7/1896 | Moore et al. | |
|---|---|---|---|---|---|
| 2,187,526 | A | | 6/1937 | Thys | |
| 2,114,727 | A | | 4/1938 | Thys | |
| 2,193,354 | A | | 9/1938 | Thys | |
| 2,496,858 | A | | 2/1950 | Crowley | |
| 2,570,844 | A | | 10/1951 | Oslund | |
| 2,699,172 | A | | 1/1955 | Regeimbal et al. | |
| 3,176,606 | A | | 4/1965 | Zoffmann | |
| 3,285,365 | A | * | 11/1966 | Longton | A01D 46/20 182/129 |
| 4,276,738 | A | * | 7/1981 | Ferraro | A01D 46/02 56/130 |
| 6,769,981 | B1 | * | 8/2004 | Perrault | A01D 46/02 460/123 |
| 6,779,329 | B2 | * | 8/2004 | Yoder | A01D 46/00 56/330 |

FOREIGN PATENT DOCUMENTS

| DE | 1026114 | 3/1958 |
|---|---|---|
| DE | 1154971 | 9/1963 |
| DE | 1255979 | 12/1967 |
| DE | 2360989 | 6/1975 |
| DE | 102008023313 | 11/2009 |
| DE | 102013109892 | 5/2014 |

OTHER PUBLICATIONS

The UVM Mobile Hop Harvester Project Report; Apr. 10, 2012; with Appended Report: Jan. 8, 2013; 51 pages.

* cited by examiner

*Primary Examiner* — Robert Pezzuto
(74) *Attorney, Agent, or Firm* — Duane C. Basch; Basch & Nickerson LLP

(57) ABSTRACT

A portable agricultural implement for the harvesting of hops that accommodates the automated removal of hops from bines as well as various features and functions associated with such removal and separation of the hops from debris.

15 Claims, 10 Drawing Sheets

US 9,699,969 B2

PORTABLE HOPS HARVESTER

This application claims priority under 35 U.S.C. §119(e) from U.S. Provisional Application No. 62/145,252 for a PORTABLE HOPS HARVESTER, filed Apr. 9, 2015 by John Bonzo et al. and from U.S. Provisional Application No. 62/168,201 for a PORTABLE HOPS HARVESTER, filed May 29, 2015 by John Bonzo et al., both of which are hereby incorporated by reference in their entirety.

Disclosed herein is a farm or agricultural implement intended for the harvesting of hops or similar crops. More specifically the implement is portable and permits use in fields adjacent hops bines to provide automated stripping or picking of hops from bines that are processed through the device. The implement is particularly adapted to the requirements of small to medium hops farms, and to the provision of hops harvesting services.

BACKGROUND & SUMMARY

Hops are grown on suspended trellises that generally extend upwardly sixteen to eighteen feet in height and higher, thereby presenting a significant harvesting challenge. When ripe, the hops are commonly cut down and on small or mid-size farm operations may be separated or picked from the bine by hand because there is no suitable hops harvester for a small scale grower. The relatively short picking season, availability of labor and other factors, such as leaves mixed in with the hops, along with bruising and discoloration, has led to the development of a small, portable hops picking machine that can be taken through the fields in which the hops are grown.

Typically, picking of hops involves first severing the hop bines, a fibrous stem that is similar to a vine, from their growing positions on the trellis structure in the field, and then transporting them to a centrally located, stationary harvesting machine or operation, where the hops coves ("fruit") are picked or separated from the bines. These machines can provide a throughput of up to 200 bines per hour; such is the case with the Wolf or LaGasse harvesters. However, such harvesters are often prohibitively expensive for small and mid-size farms (costs in excess of $40 K), where they are only used for limited times during short harvest seasons.

After being cut down and transported, the bines are hooked onto a conveying mechanism and the bine is pulled into the large stationary harvester along a horizontal or vertical path. In more recent years larger hops producers may drive or pull a tall machine down a row of mature hop bines seeking to shake or strip the bines while they remain tied to the trellis. These tall machines have vertical picking fingers that strip the bine of all the foliage, including the hops, which is subsequently singled out within the harvester by a variety of well-known processes, for the most part based on gravitational parsing.

Recently there has been a resurgence of interest in growing hops on a regional or local level as craft and microbrewers seek regional ingredients with predictable and unique characteristics that make their brews distinctive. Additionally, in the interest of supporting local agriculture, it is known that legislation has been enacted, at least one state (e.g., New York), that requires or encourages at least a portion of the hops used in a micro-brewery be grown and procured locally. Accordingly, the disclosed embodiments address an unmet need for a less expensive and portable hops harvesting implement that would fulfill the requirements of smaller scale, emerging local hops growers having from about one to ten acres of hops.

Disclosed in embodiments herein is a portable horizontal produce picking implement for the removal of hops from a bine, comprising: a generally horizontal bine transport loop or carousel extending through and outwardly from the forward and rearward ends of the implement, said carousel including at least one bine clip; a shroud operatively associated with at least a portion of said bine transport loop; a plurality of picking rakes arranged on rolls forming a picking nip region therebetween for contacting the bine and separating the hops from the bine; a helical bine positioning member biasing the bine toward the center of the picking nip region; at least one inclined separating conveyor belt (e.g., at an angle of about 30 to 45 degrees) positioned below the picking nip region, said separating conveyor belt having a perforated surface and a negative pressure at the upper surface thereof; a debris conveyor in proximity to the upper end of the inclined separating conveyor belt to debris from the upper surface of the separating conveyor belt; a hops conveyor located beneath said inclined conveyor to transport hops on a surface thereof toward the rear of the implement and a collection location; a single blower simultaneously providing negative air pressure to the upper surface of the separating conveyor belt to enable the segregation of the hops from the debris and positive pressure to directed to an end of the hops conveyor to blow and further separate any debris mixed with the hops as the hops falls from the hops conveyor; and a tow bar for connecting the implement to a vehicle for transport; a power take-off connection for transferring mechanical power from the vehicle to the implement, said connection being operatively connected to a transmission to facilitate the distribution of mechanical power to at least the conveyor belts and rolls; at least one hydraulic turbine having hydraulic fluid pressure sourced from said tow vehicle, said hydraulic turbine being operatively associated with at least the bine transport loop or carousel and providing a driving force to a drive sprocket thereon; and at least two wheels 810 associated with said implement for the purpose of transport.

Further disclosed in embodiments herein is a method for the harvesting of hops including: attaching a hop bine to a bine hook or clip; using said bine clip, pulling said bine horizontally into a harvester; removing leaves and hops from said bine; collecting said hops and leaves onto a conveyor; separating said hops from said leaves with gravity and negative air pressure; apply a positive air pressure to eliminate foreign matter from the separated hops; and placing hops into a collection container.

Also disclosed herein is a portable horizontal produce picking implement for the removal of hops from a bine, comprising: a power take-off for transferring mechanical power from a tow vehicle to the picking implement to drive components; a second source of power (e.g., hydraulic) sourced from said tow vehicle for operating at least one component of the implement separate from the power take-off; at least two wheels directly affixed to said implement for the purpose of transport; a series of wire formed picking fingers arranged in rows for separating the hops and leaves from the bine; a continuous horizontal bine carousel loop extending longitudinally from the front and rear ends, and including at least one bine hook for pulling a bine through said rows of picking fingers; a shroud (conveyor belt pieces attached to a roller chain) for preventing the bine from becoming intertwined with said continuous carousel loop; a bine positioning member having helical surfaces thereon for contacting the bine and biasing the bine to pull through a central region of the picking fingers; at least one inclined conveyor having a perforated belt(s) thereon, said conveyor disposed beneath said picking fingers at an angle of about 30 to 45 degrees, said at least one belt having a negative pressure applied from the interior to a top surface thereof to attract stripped leaves and debris; a horizontal hop conveyor situated beneath said at least one inclined conveyor; a horizontal debris conveyor situated in proximity to an end of the last of the at least one inclined conveyor; and a single blower providing both positive and negative air flow to assist in the segregation of the hops from debris.

Further disclosed in embodiments herein is a generally horizontal bine transport carousel for an agricultural implement, comprising: at least two rotating sprockets, at least one sprocket located at each of the opposite ends of the implement; a roller chain spanning between and at least partially in contact with the sprocket peripheries so as to be operatively driven by at least one of the sprockets to which a driving force is applied; and a shroud applied to at least a portion of the transport carousel to prevent fouling of the roller chain by the bine.

Figure 1:
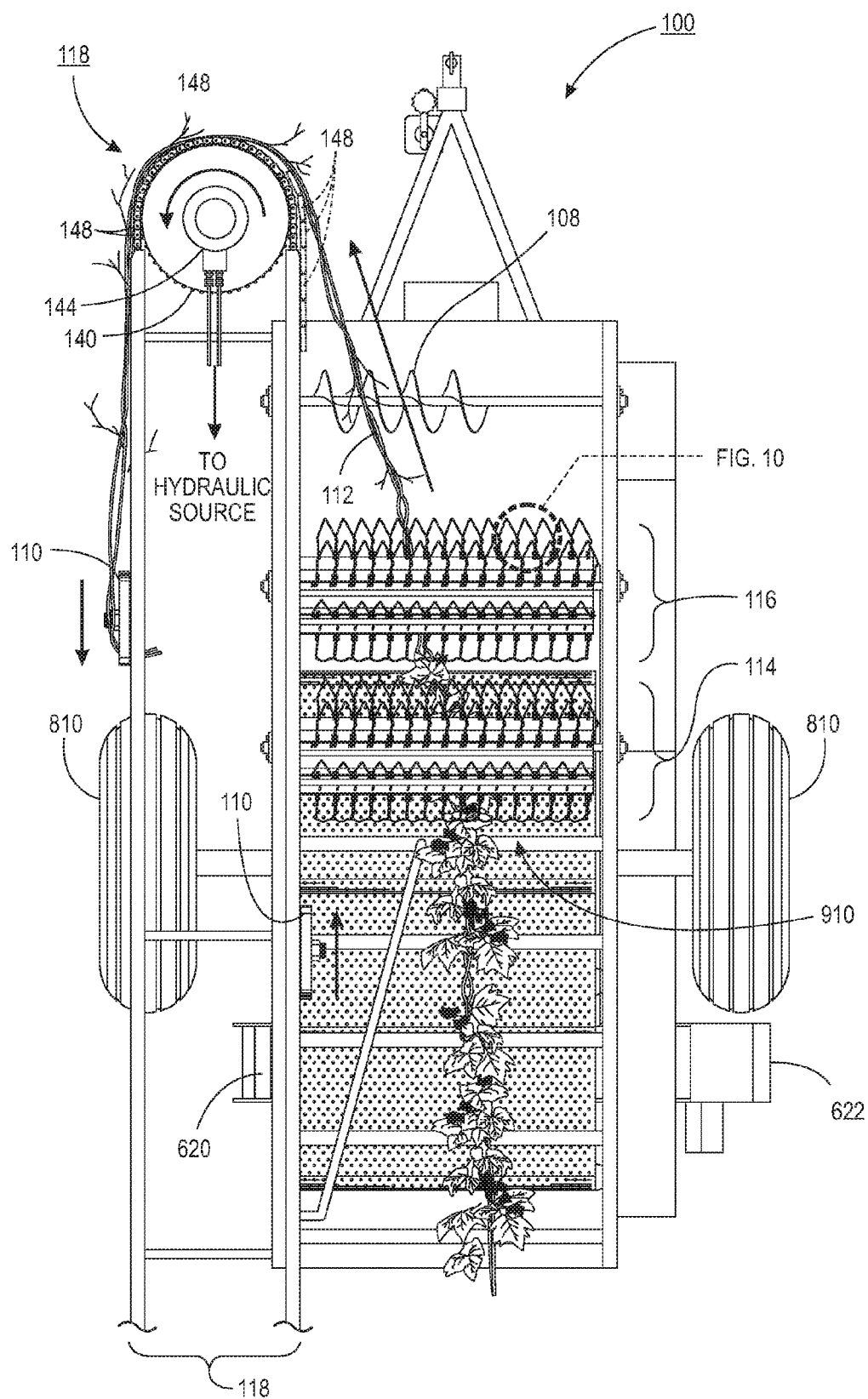
FIG. 1 is a top planar view of a harvester in accordance with the disclosed embodiments.

The various embodiments described herein are not intended to limit the disclosure to those embodiments described. On the contrary, the intent is to cover all alternatives, modifications, and equivalents as may be included within the spirit and scope of the various embodiments and equivalents set forth. For a general understanding, reference is made to the drawings. In the drawings, like references have been used to designate identical or similar elements. It is also noted that the drawings may not have been drawn to scale and that certain regions may have been purposely drawn disproportionately so that the features and aspects could be properly depicted.

DETAILED DESCRIPTION

Referring to FIG. 1, depicted therein is a top down illustration of a hops harvesting implement 100 in accordance with one of the disclosed embodiments. In operation, elongated bines are removably attached to bine clip 110, which is designed to readily engage and disengage the butt (lower) end of a bine and pull it through the harvester. One or more bine clips 110 (e.g., FIG. 2) are further affixed to carousal conveyor subsystem 118 for the purpose of drawing the bine(s) through the hops picking subsystem 200 of the harvester 100. Although described relative to hops bines, the disclosed embodiments, and components thereof may have further applications for the harvesting and processing of other agricultural items such as vine-based fruits, vegetables and the like.

Figure 3:
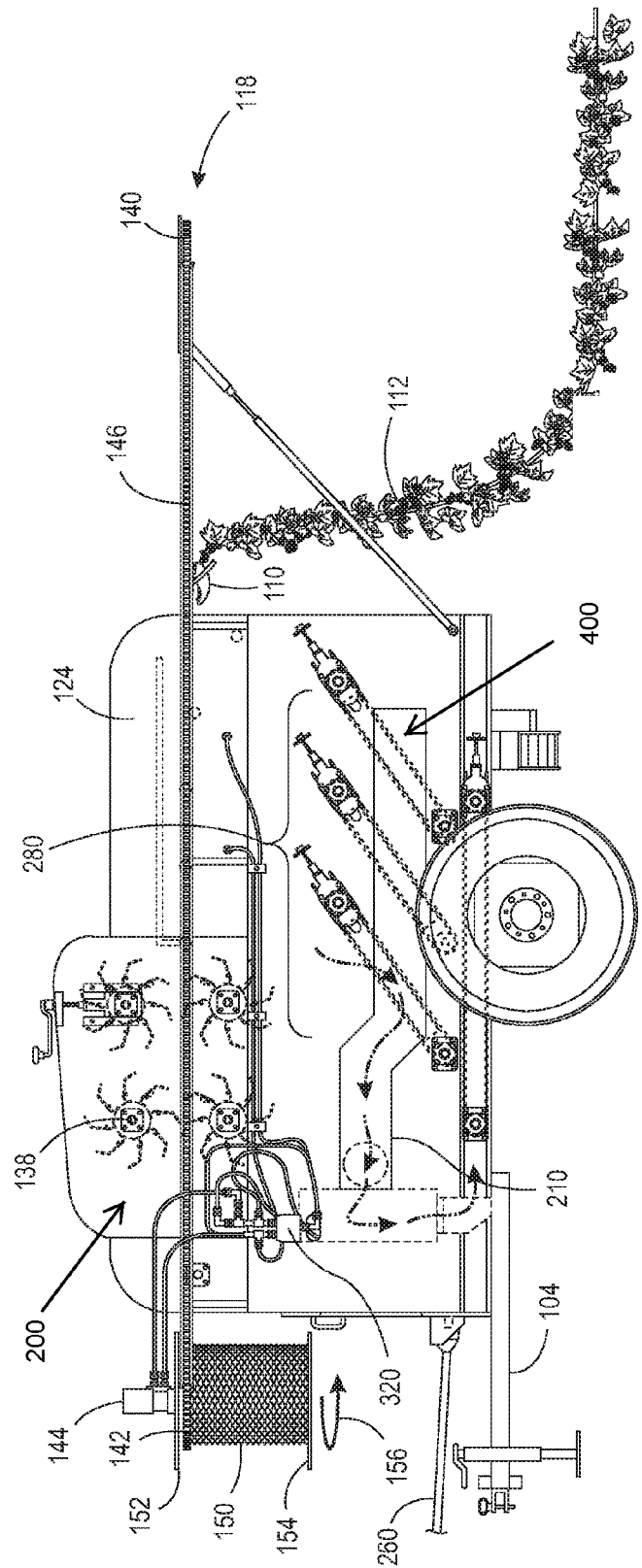
FIG. 3 is a left side view of the harvester in accordance with the disclosed embodiments.

Carousel conveyor assembly 118 includes a hydraulic drive 144 operatively coupled to one or more sprockets 140, 142 located the ends end (e.g., back and front) of the implement, such as a hydraulic or electric motor, which in turn moves a continuous conveying surface such as a #60 roller chain 146 of approximately 20-feet in length along a continuous or endless loop or path. Roller chain 146 is illustrated as a single-strand (single-width) chain, although it will be appreciated that double-strand or wider chain links may be employed with commensurate changes to the sprockets. Although variable in speed the chain may be driven at speeds in the range of about 40 feet/min. More specifically, for example as depicted in FIG. 3, the chain 146 is driven by a single front sprocket 142 (e.g., approx. 24-inch diameter) at the forward end of the implement, and the sprocket 142 has a cylindrical shroud(s) 150 extending vertically (e.g., downward) therefrom just inside the chain teeth 152. The shroud also may include a flare 154 along the bottom, so that in rotation (direction of arrow 156) the bine is pulled around the cylindrical shroud with the sprocket as the chain and bine hook advance, and there are no surfaces or recesses in the carousel upon which the bine can become entangled as it exits the picking subsystem. In addition, a helical deflector 108 (FIG. 8), such as an auger extending at least about one-half way across the width of the picking subsystem, serves to encourage or bias the bine 112 to move through a position toward the central portion of the picking/stripping subsystem, away from the conveyor's sprocket area.

In an alternative embodiment, a shroud in the form of a plurality of vertical segments or plates 148 (e.g., Rexnord Table-top® chain conveyors, Series 843), may be attached to the endless roller chain for the purpose of deflecting or holding the bine away from the chain, sprocket or other moving mechanical members of conveyor subsystem 118.

Figure 2:
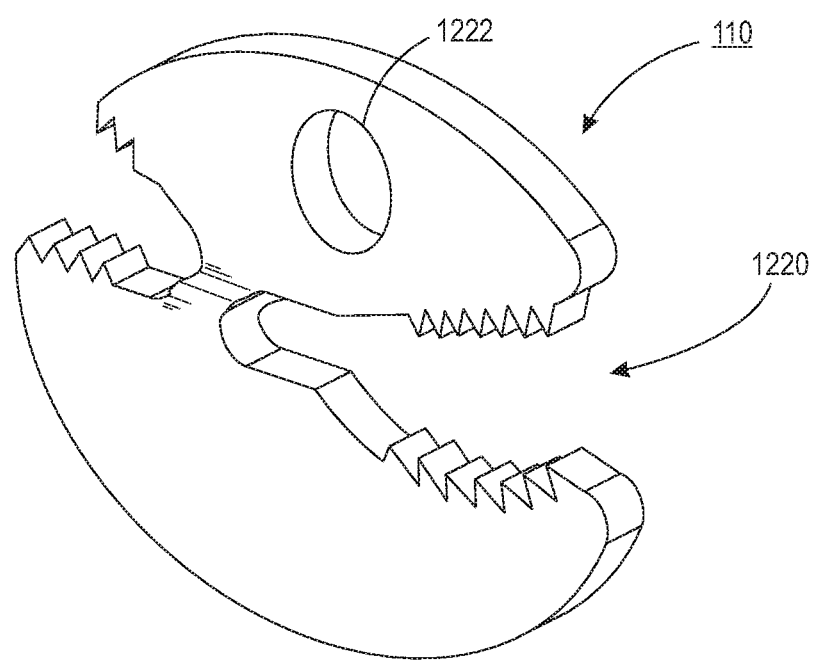
FIG. 2 is an enlarged view of an exemplary bine clip in accordance with one of the disclosed embodiments.

In summary, and referring to FIGS. 1-3, bine conveyor subsystem 118 includes chain 146 that is at least partially wound about at least one forward drive sprocket 142 and at least one rearward sprocket 140. The chain, driven by the forward sprocket that is operatively associated with drive 144, uses one or more bine clips 110 to pull a bine through the picking subsystem 200. Although not depicted, the disclosed embodiments contemplate the ability to queue up or possible even auto-load bines to the carousel conveyor. Such a system may allow a single operator, or at most two, to effectively operate the harvester where the operator may both load and unload bines in addition to handling the hops being output at a collection location.

Referring also to FIG. 2, as previously mentioned, one and possibly two or more bine clips 110 are mounted on conveyor subsystem 118, where an operator "hooks" the bine to the conveyor, preferably while moving. Each bine clip includes a generally oval-shaped piece of metal stock having at least one toothed notch 1220 cut therein. The teeth of the notch are inward-facing so as to discourage a bine inserted therein from easily pulling out of the notch. The clip is bent slightly outward on the bottom so that at least one side of the notch is tipped or angled outward from the conveyor making it easier to attach the bine. Hole 1222 provides a location by which the clip can be attached to endless roller chain 146 using a pin or bolt extending from the chain, while allowing the clip to travel freely along the conveyor path with the bine attached. Once stripped within the picking subsystem 200, the bine is subsequently disengaged.

An alternative hook arrangement is further contemplated whereby a cam-like pawl or similar feature is self-binding as bine 112 is inserted and cinched within the hook, but then again is counter-reactive to a downward force from the bine by virtue of the cam angle. Examples of such bine hooks are found in U.S. Pat. Nos. 2,699,172, 2,570,844, 2,496,858, and 2,193,354, which are hereby incorporated by reference in their entirety, and may form a part of an auto-loading carousel.

Figure 10:
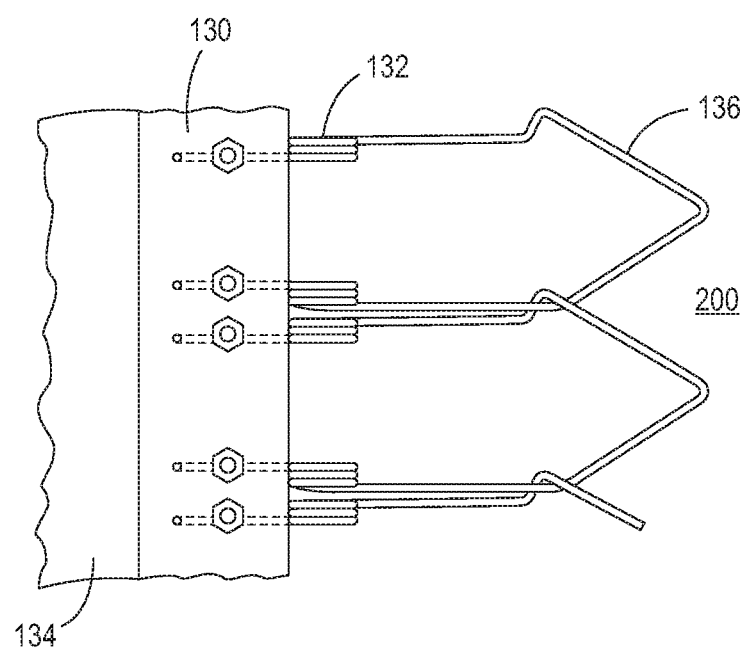
FIG. 10 is a partial view of an exemplary stripper roller showing detail of the bine fingers or rakes.

Having described the manner in which bine 112 is transported into and through the harvesting implement, a further description of the picking subsystem 200 is now provided. The hops (cones or flowers) are mechanically "raked" or separated from the main fibrous stem by virtue of a plurality of resilient wire-formed members 136 which are in rotational contact with the leaves, stems and hops on a bine(s). As depicted in FIGS. 1, 3, and 10, for example members 136 are arranged in sets and attached to a backplane roller 134 by fasteners 130 forming one rake member of many within the pairs of bine rake assemblies 114 and 116 included with picking sub-system 200. In one embodiment, the picker or stripper roller assemblies, comprising roller, angle-iron fasteners and replaceable picker finger rakes has a diameter of approximately 15-inches. More specifically a plurality of bine rake members 136 are attached at equidistant intervals about the circumference of the approximately 6" stripper rollers, and the rollers are in turn mounted on shafts through bearings 138 on the implement side panels 122 (right) 124 (left). The rake members 136 may be attached to the rollers using angle-iron to facilitate production of individual rake assemblies and the subsequent attachment of the rake assemblies to the rollers. More specifically, the angle-iron may be welded to the roller surface and the rake fingers attached thereto using fasteners.

In the illustrated embodiment two pairs of bine rake assemblies, 114 and 116 form picking sub-system 300. The stripper rollers for each assembly are driven via a pulley (126) and chain or belt (not shown) on the exterior of side 122, and rotate in a direction counter to the direction the bine is pulled through the nip (i.e., region between a pair of stripper rollers). The formed-wire rake members 136 have an inherent resilience due to coil spring 132 that serves to strip the leaves and hops from the main stem. Therefore, the work of stripping the bines is accomplished by subjecting bines 112 to the stripping influence of successive rows of flexible members 136 arranged within rake assemblies 114 and 116, and in particular having an upper rake assembly working in unison with a lower rake assembly. In one embodiment (not shown), the amount of stripping force or agitation applied by the rake fingers 136 can be varied by adjusting the relative position or nip separation distance between pairs of rollers, for example, by adjusting the position of the upper rollers in each pair along an arcs, thereby providing an adjustable gap therebetween. It will be appreciated that alternative stripper roller configurations may also be provided, including configurations with odd numbers of staggered rollers, additional pairs, etc. In an alternative embodiment, for example, three picker rollers may be employed, where a top roller is located vertically above and horizontally between two lower rollers, (e.g., inverted "V") and the top roller forms a picking or stripping nip between each of the lower rollers and the bine moves in a serpentine path as it traverses the nips. Moreover, the spacing or nip between the picker rollers themselves can be adjustable as can be the rotational speed of the rollers, which allows the harvester to be adjusted based upon the conditions of the bines and hops thereon to obtain the optimum stripping characteristics.

Although generally depicted and designed to employ conventional pulleys and drive belts so as to facilitate maintenance of the implement, it will be appreciated that some or all of the moving components of the implement could be interconnected using chain drives and sprockets, or they may be outfitted with separately adjustable drive motors (e.g., electric or hydraulic) so as to be independently controllable.

In the illustrated embodiment, two pairs of picker or stripper rollers are employed to produce two stripping nips where the bine 112 passes through the rake assemblies, primary roller pair 114 and secondary roller pair 116 respectively, with the primary difference between the two being the spacing of the nip or gap between the upper and lower rollers. Stripping of the bine is a successive process, and having a larger gap on the primary or first stripping nip to remove a majority of the leaves, stems and hops followed by a smaller nip on the secondary assembly, to extract any residual hops that were previously left behind, is believed to be preferred. In one embodiment the nip or gap is set within a range of about 6-8 inches for the primary rake nip and about 4-6 inches for the secondary rake nip, and as noted above, some embodiments may make the nip separation distance adjustable.

Located in-line with the output side of the secondary rake assembly 116 in transport 100 is helical auger member 108, which is also driven in conjunction with the stripper rollers. As a result of the nature of a bine's stems it is essential that the bine be pulled through the central portion of the picking subsystem. Nonetheless, the tendency of the side-mounted carousel is to put the bine toward the side. However, the bine is initially directed toward the center of the stripper roller nips by an angled tubular guide 188 (FIG. 7) extending from the left side at the rear or intake end of the harvester. Moreover, use of the rotating auger 108, where the bine is pulled across the helical surface, provides a biasing force on the bine to direct and maintain a more horizontally centered position of bine 112 as it is pulled through the picking subsystem 200.

Figure 7:
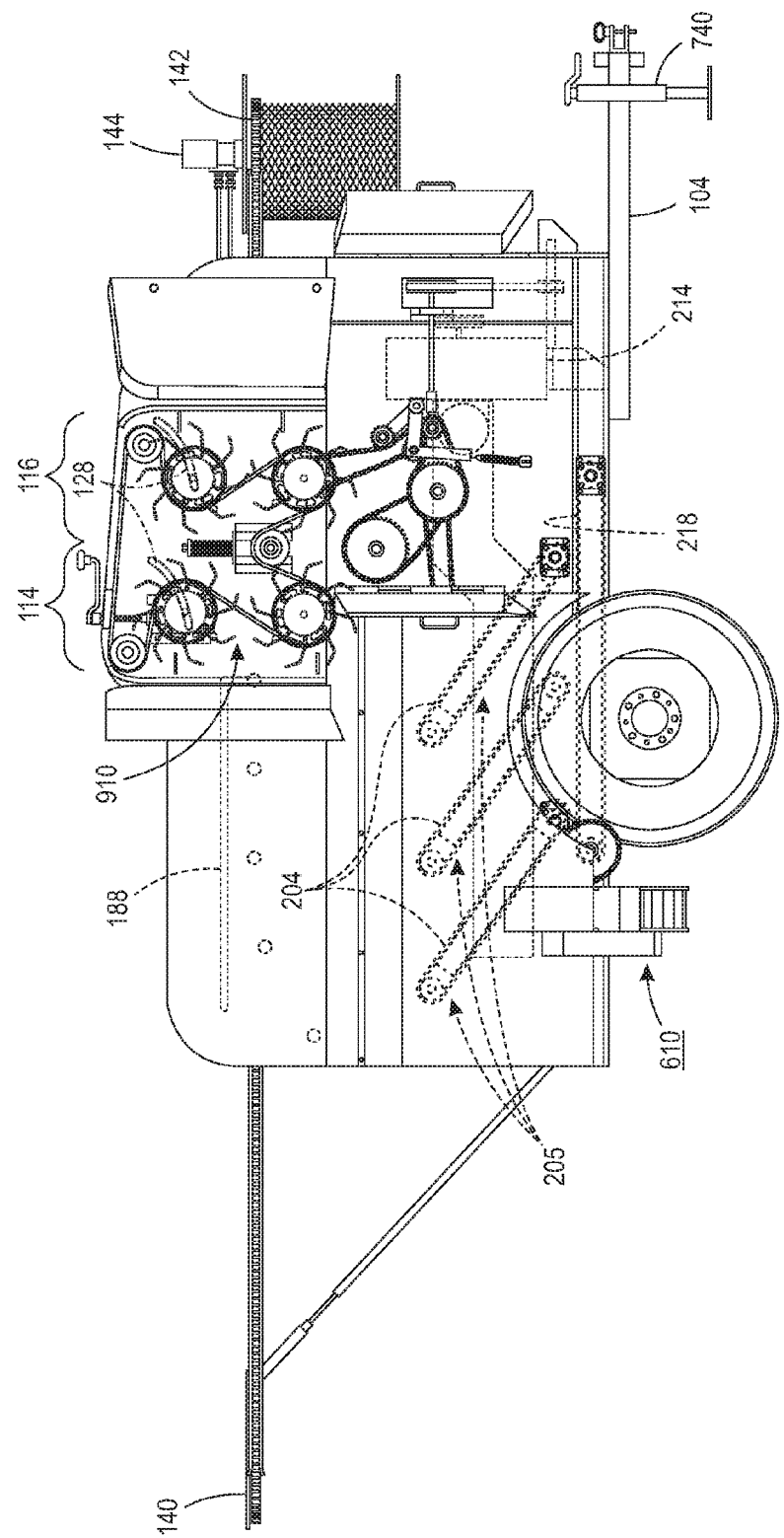
FIG. 7 is an interior view of the harvester from the right side to illustrate the bine stripper rollers, conveyors, carousel and other components therein.

Turning now to FIG. 7, for example, a cut away side view reveals the hops/leaves separation or sorting subsystem 400. Sorting subsystem 400 comprises a series of conveyor belts in combination with a pressurized air system. Having stripped the foliage from bine 112 in the bine picking subsystem 200, gravity causes the stripped hops, bine pieces, leaves and stems to drop into the separation subsystem 400. Conventionally, there are one or more angled sorting belts 205, positioned at an angle and moving at a speed (top surface moving upward) that encourages the leaves to travel upwardly on the upper surface of the belt while the hops fall down and off the belt, due to their respective mass differential and form factor (hops being heavier and more dense). The angle of inclination for the upper surface of the sorting belt(s) may be fixed or adjustable in accordance with variables inherent to the foliage mix (e.g., moisture, size, mass and extraneous content). In one embodiment the range of angles for the sorting or separating belt is from about 35 to 45 degrees, whereby each of the sorting conveyors may be adjusted as determined by empirical results. While illustrated at the same angle, it may also be possible, in embodiments including multiple sorting belts, to incline one or more of the belts at different angles relative to the other belts. For example, a belt having a steeper angle may more aggressively encourage the hops to drop down the belt surface.

More specifically, sorting or separation conveyor(s) 205 may further include surface characteristics that make them able to attract light-weight debris while shedding the loose hops. For example, the belts may have perforations along a portion or the entire surface of the conveyor belt 204 which allow for the passing of air therethrough. In one embodiment, the perforations in the conveyor belt surface are staggered, and the inlet to blower 214 delivers a negative static pressure via manifold 210 to at least one and possibly each of the separation belt(s) 204 to ensure that all materials, exclusive of the hops, are pneumatically attracted to the upper belt surface to assist them in overcoming gravitational forces and hence conveyed to the pinnacle of the separation belt 204 and separation conveyors 205. Belts 204 may also include roughened surfaces or other regular or irregular surface characteristics (dimples, irregularities, ridges, etc.) that improve the contact between the belt and debris that is to be separated from the hops.

As the separated debris approaches the uppermost portion of conveyor 205 a platen 202 located beneath the surface of the conveyor belt ends and the negative air pressure supplied by the platen stops, which in turn allows the debris to fall over and away from the top edge onto a successive separation conveyor belt 204 of separation subsystem 400, (assuming more than one separation belt is present). The platen 202 may be a box or trough-like component having an air connection to a duct between the fan inlet and the platen. The platen itself, as well as the associated ducting 280 and manifold 210 may include one or more baffles or other devices to adjust the flow of air therethrough, and thereby enable an operator to customize the flow of air through the vertical conveyor surfaces. Also contemplated are one or more hinged duct components and/or access doors so that the ducts and platens may be easily accessed to clean our any accumulated debris or particulate matter. Platen 202 may also include an ultra-high molecular weight (UHMW) slides or trim along the edges thereof to allow the platen to contact the rear surface of the belts 204 and minimize air flow through that region, while avoiding or at least minimizing abrasion to the belt due to such contact. This iterative separation process continues until the last separation belt 204 is reached, at which time debris exits the last conveyor and moves to the rear of the implement to be discarded by the last conveyor. In an alternative embodiment, a discharge ramp or chute may be employed to assure that the leaves, stems and other remaining debris fall to a point well beyond the separation sub-system 400.

Concurrently, hops conveyor 218 receives the separated hops, falling from the sorting conveyor system 205 above, and subsequently transfers or drops them onto the auxiliary hops conveyor 610 (described below) or into a collection bin 216. Also contemplated in association with the sorting belts 204 and the conveyor 218 is the addition of a louver or similar mechanism adjacent the lower end of one or more sorting belts to adjustably limit the space or gap between the bottom of the sorting belts and/or the conveyor such that the hops cones are allowed to roll past or over the louver whereas the leaves or other debris are prevented from passing through and thereby remain in contact with the sorting belt.

Also associated within hops conveyor 218, or possibly with the auxiliary hops conveyor 610, may be a positive air pressure nozzle or knife, receiving air flow from the outlet of common blower 214, which strategically directs an adjustable stream of air beneath, and across the end of the hops conveyor 218 (e.g., over horizontal belt conveyor 620), just above a hops collection location, thereby blowing any non-hops vegetation that may have been deposited onto the hops conveyor 218 during the separation operation over the auxiliary hops conveyor and out the rear of the implement. In one embodiment a single, impeller-type blower 214 provides for both a negative static pressure to the platen 202 beneath the separation belt(s) 204, as well as the aforementioned positive air flow to the air knife or nozzle as the hops exits separation sub-system 400 and hops conveyor 218 in particular. Furthermore, the direction and amount of air flow out of the air knife may be controlled by a damper adjustment. In particular, not only can the fan speed be adjusted based upon the PTO speed, but the inflow and outflow can be adjusted using dampers associated with the components that are connected to the fan. It will be appreciated that other positions within the implement may receive and/or utilize positive or negative pressure air flow for various cleaning or sorting purposes and are not limited to those described and illustrated.

Power to drive the numerous conveyors, blower 214 and helix positioner 106, etc. is either self-contained and/or externally derived. In one embodiment a tow vehicle is relied upon to provide the mechanical power source in the form either, or both, a power take-off (PTO) and/or hydraulic pressure. Power transmission throughout the harvester is facilitated through a series of drive chains, shafts, pillow blocks, gears, pulleys and belts in communication with a PTO clutch. Engagement of the PTO 260 is controlled in response to a belt-drive and idler pulley system, and a lever 460 or similar engagement or tensioning system is used to manually engage the drive mechanisms to the PTO power. In operation, the PTO incoming speed may be set to operate at about 300-540 rpm. In the case where it is not mechanically feasible to transfer power to a specific location within the harvester, or due to the desirability of an independently variable speed control, a hydraulic or other motor may be used as the power source, such as the case with the bine conveyor subsystem 118, for example. It should be further noted that the foliage may be quite heavy on some hop bines and comparatively light on others, therefore it may also be desirable to have the speed of the bine drive independently variable from the picking roller speeds to accommodate the prevailing harvesting conditions. Alternatively, the mechanical power source necessary to drive the various components such as conveyors, blower, etc. may be self-contained and provided from sources such as an electrical drive motor, liquid fuel or gas powered engines, etc. In one embodiment, the mechanical power source may include a 29-Horsepower Briggs & Stratton gasoline engine with an associated hydraulic pump. Such a source may be separate from the implement and attached via the PTO coupler 260, or it may be integrated with and attached to the implement, for example, on or near the tongue where the PTO coupler is attached. For example, the mechanical power source may be integrated with a bolt-on replacement tongue 104 so that the illustrated tongue may be removed from the harvester and replaced with a tongue and power source that can be connected to the harvester power distribution system via the PTO and hydraulic connections.

The harvester 100 further includes a chassis including an axle set having trailer tires 120 attached thereto and a tow bar, having hitch 102, affixed to the forward portion of the chassis. It will be appreciated that the chassis and the implement size may be based upon or consistent with known implement chassis (e.g., a manure spreader) so as to facilitate the attachment and operation using known components (trailer tires, frame, tongue, power take-off, etc.). It will be appreciated that the chassis, and particularly the axle, tires, tongue, etc., may be produced in compliance with Department of Transportation vehicle highway regulations to produce an over-the-road suitable implement that may be easily transported. The tongue 104 may further include a hitch receiver for attachment to a vehicle, as well as a stand 740 or similar device to support the tongue when not connected to the vehicle.

At the rear of the implement, an auxiliary hops conveyor 610 is included, or alternatively a simple bin, to receive and assist in the transfer of the sorted hops out to a side chute and bins or other processing equipment that may be placed adjacent the implement. In one embodiment the auxiliary hops conveyor includes a generally horizontal belt conveyor 620 and an upwardly angled belt conveyor 622, where the belt of conveyor 622 includes ridges or bars on the surface to prevent hops from rolling backward and down the conveyor. The auxiliary hops conveyor may be driven by a hydraulic power supply in order to allow variable control of the conveyor belts and their speed, and to better serve to move and elevate the hops out the side of the device where they can be further collected or processed. The auxiliary hops conveyor may, for example, move the hops into bins, bags or similar transport containers, either automatically or with the aid of an operator. It will be appreciated that although shown as belt conveyors, alternative conveying techniques may be employed, including vibratory conveyor(s), auger(s), etc. For example, an auger-type mechanism may be used to move the sorted hops in an upward direction. Moreover, the auxiliary hops conveyor as well as alternative conveying equipment or associated bins, hoppers and the like may be collapsible or detachable from the harvester 100 in order to facilitate movement or over-the-road transport of the harvester.

Figure 4:
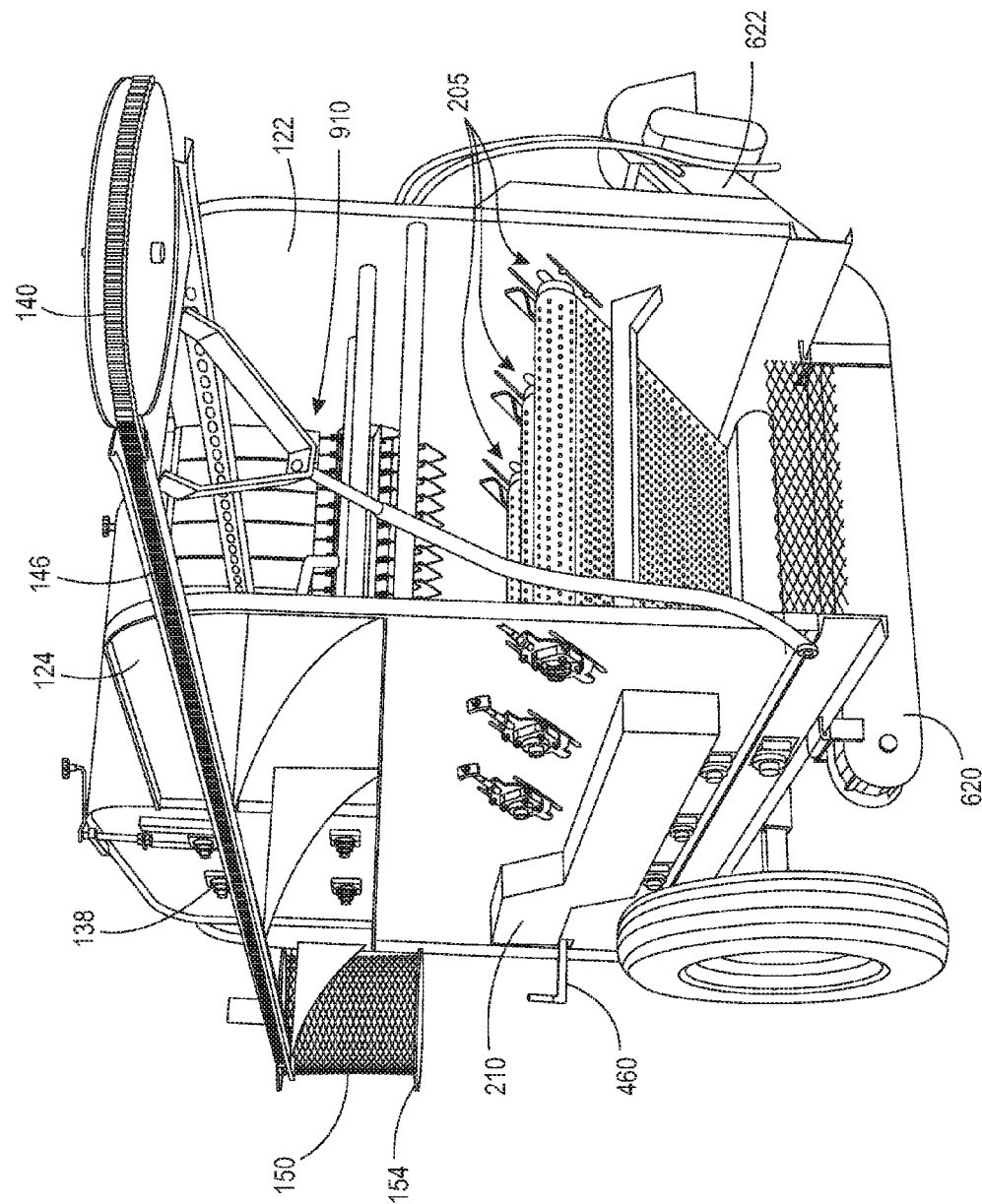
FIG. 4 is a left rear perspective view of the harvester in accordance with the disclosed embodiments.
Figure 5:
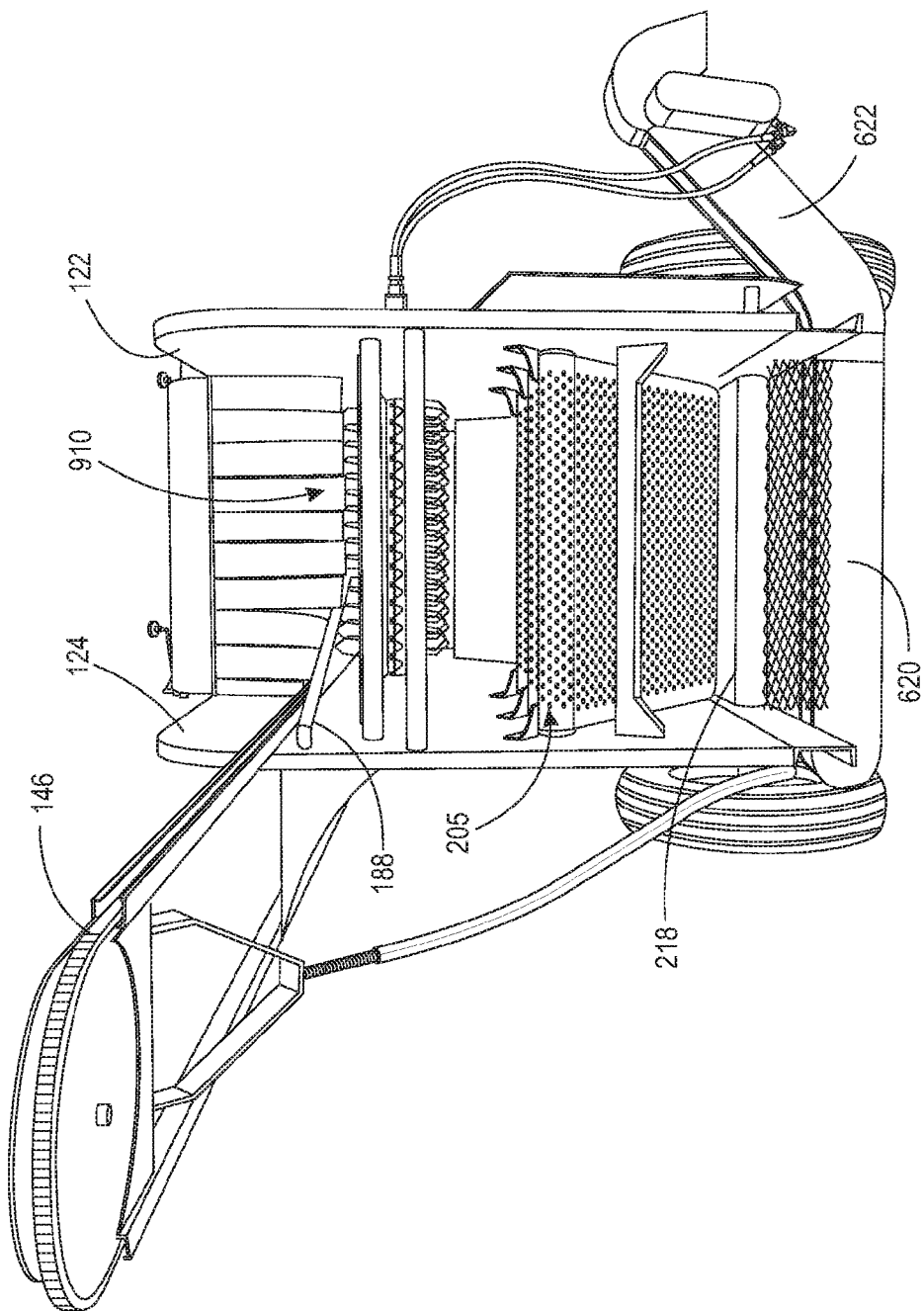
FIG. 5 is a rear view of the harvester in accordance with the disclosed embodiments.
Figure 6:
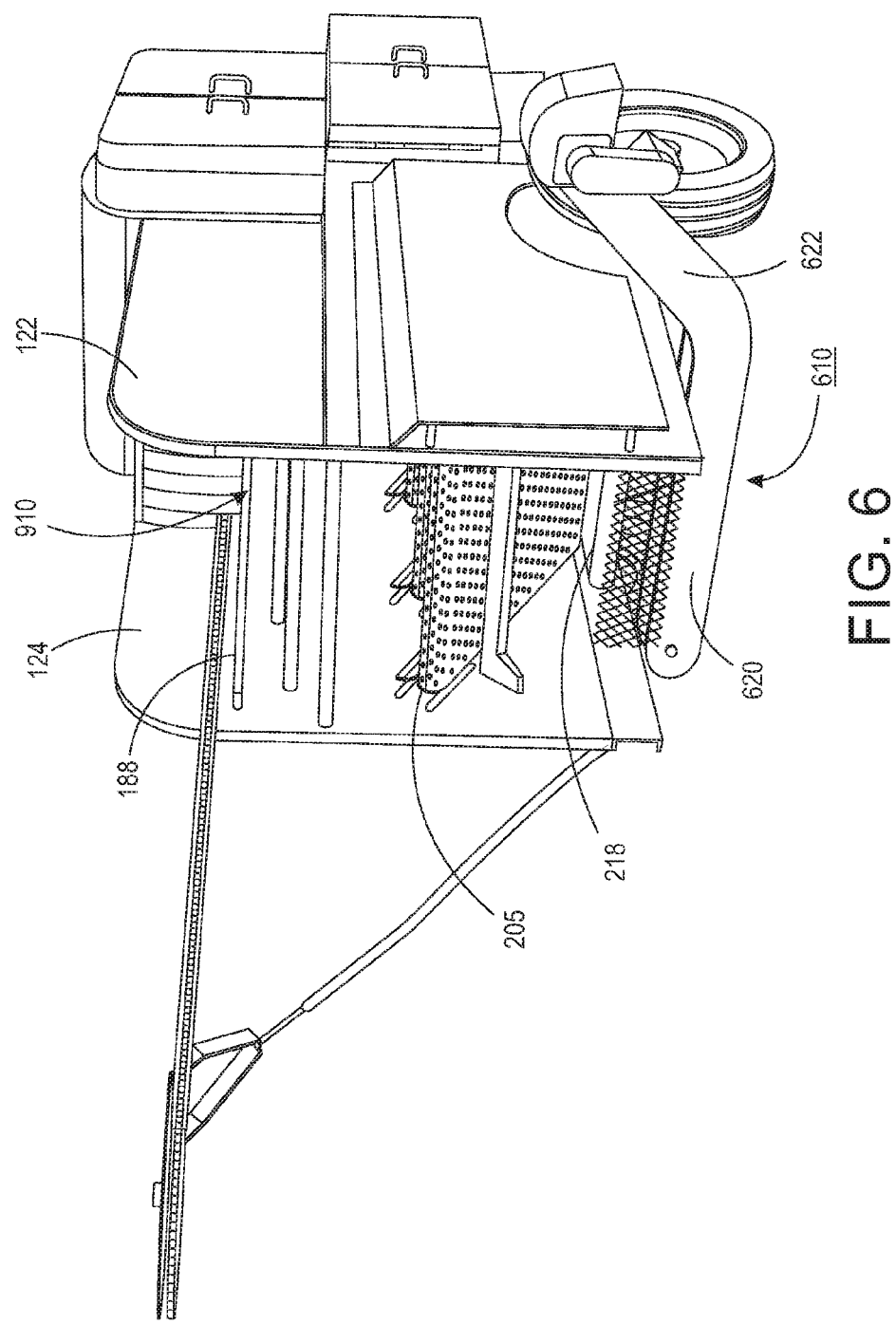
FIG. 6 is a right rear perspective view of the harvester in accordance with the disclosed embodiments and with all covers and doors closed in an operational configuration.
Figure 8:
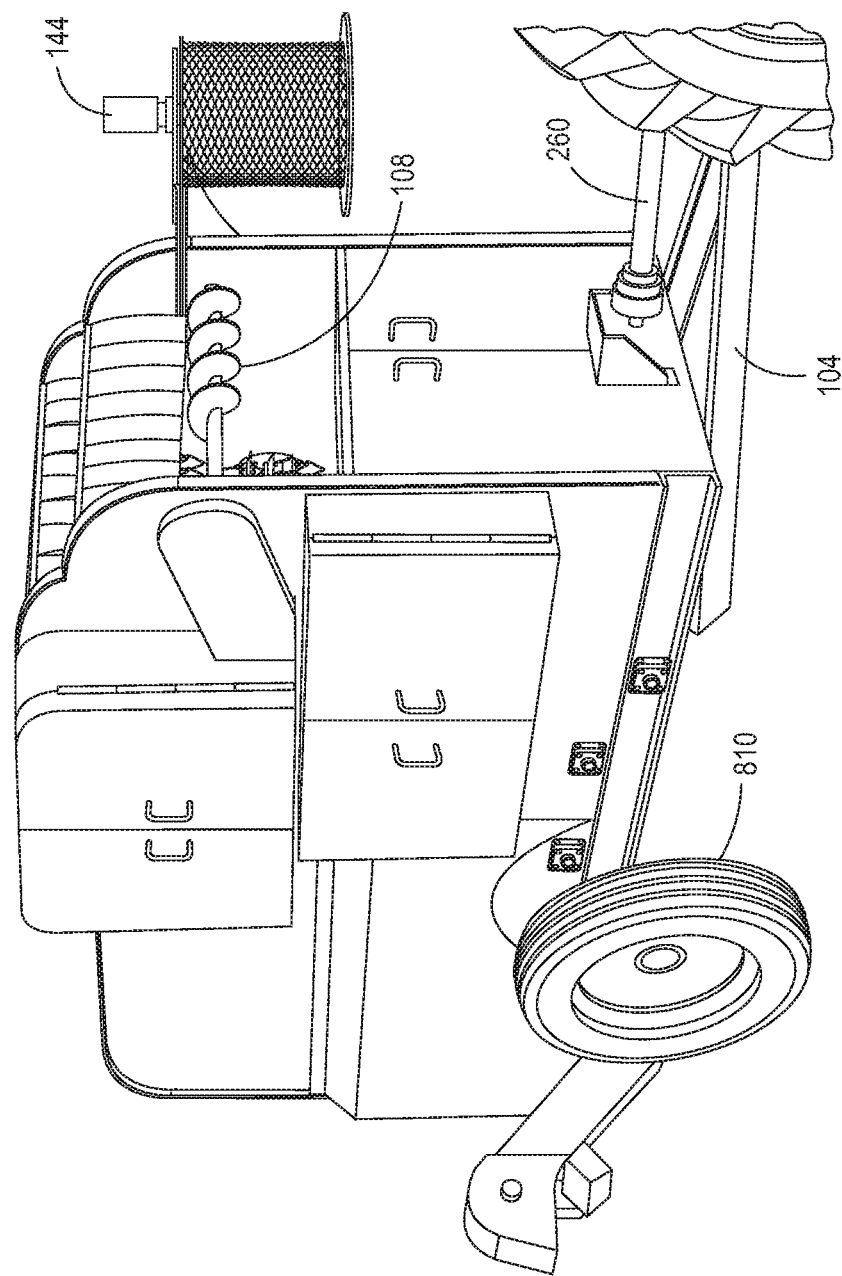
FIG. 8 is a perspective view of the front right sides of the harvester.
Figure 9:
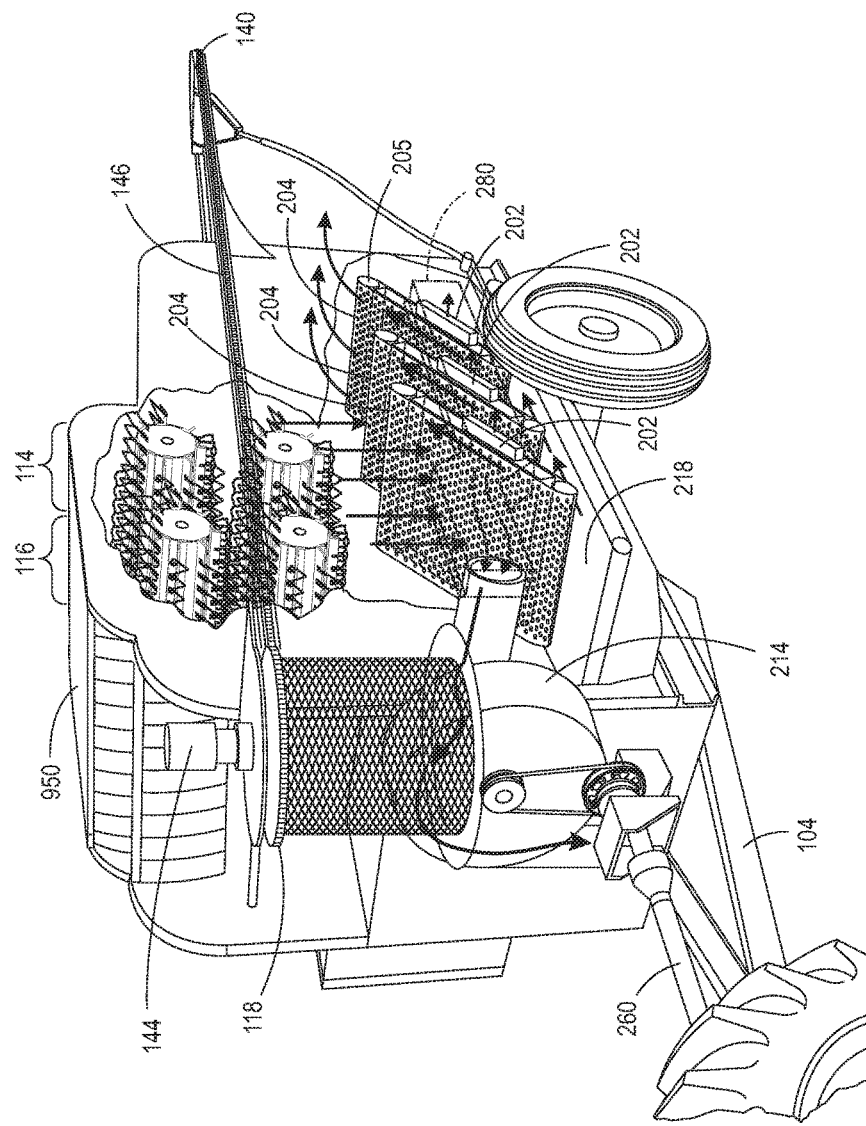
FIG. 9 is a cutaway view of the harvester from the front left side.

Turning now to FIGS. 3-9, depicted herein are illustrations of various views about the periphery of an embodiment of the disclosed harvester implement. While incorporating many of the features disclosed above, the embodiment depicted also includes various covers and doors (e.g., hinged panels with handles, etc.) that provide protection from moving belts, chains, sprockets, etc. For example, FIG. 3 shows a portion of the hydraulic system, including the regulating valve(s) 320 used to control the speed of the chain driven by the shrouded sprocket. As illustrated, the shroud 150 includes a perforated metal central region and a bottom flare 154 extending radially therefrom. As previously described the shroud is intended to prevent the bines from becoming entangled in the chain and drive mechanisms, and it will be appreciated that a different size shroud or an alternative design may be used in addition or as an alternative. FIGS. 4-6 show the rear of the harvester with the inclined, perforated conveyor belts, as well as the support bearings for the associated driven rolls and idler rolls that support the belts. FIGS. 3 and 8 show the manner in which mechanical power is supplied via a PTO connection to a tractor, and hydraulic power is provided as well via hoses that are connected to a hydraulic port on the tractor or a separate pressurized hydraulic supply.

Having described various features and components of the illustrated embodiments, attention is briefly turned to additional or optional features and benefits of a hops harvesting implement being contemplated. In one embodiment, instead of having an attached top or cover over the picking subsystem, it is contemplated that the top may be movable with respect to the sides, thereby permitting the top to me removed or at least pivoted upward to allow access to the subsystem in the event that the picker or stripper rollers or other components need to be accessed for cleaning and the like. Another feature that may prove beneficial is a release mechanism by which the drive belts or gears for the picker rollers are disengaged in order to place the picker rollers into a "neutral" drive position, thereby allowing the rollers to freely rotate forward and backward in order to untangle or clean bine and other debris (e.g., coir rope, etc.) from the rollers.

Another feature contemplated in accordance with the disclosed embodiments is the inclusion of one or more sorting sieves or screens may be employed to sort and/or remove large collections of debris, etc. For example, a coarse sieve in the form a suspended screen or a rolling mesh belt conveyor may be employed in a position between the picking subsystem 200 and the sorting subsystem 400 to collect and remove bouquets (e.g., large collections of leaves and hops, pieces of bine, etc.) so that they do not interfere with the sorting of smaller hops and debris that are allowed to pass through the sieve to the sorting belts and conveyors below.

In yet another alternative embodiment, the harvester 100 may be implemented without one or more of the subsystems disclosed above. In one alternative embodiment, the harvester may be implemented without the sorting subsystem 400 so that the implement is able to strip hops from the bine, but provides no sorting capability. Such an embodiment may still include one or more transport conveyors (e.g., hops conveyor 218 and or auxiliary hops conveyor 610) to move the hops and debris to another location for sorting. In another alternative embodiment, harvester 100 may be implemented without a stripping capability (no carousel conveyor 118 or stripping subsystem 200), whereby materials such as combined hops and leaves that have been stripped from a bine are poured or placed into the front of the harvester (tongue end) and allowed to proceed to the sorting belts and processed as described above. As will be appreciated it may also be possible to operate these first and second alternative embodiments in conjunction with one another, or additional implements, as required for particular harvesting and processing operations.

As noted above, the various descriptions and illustration set forth in association with the disclosed embodiments are not particularly limited in scale, and as noted, several of the components may be provided in singular or plural configurations. Furthermore, the relative size and capacity of the disclosed embodiments is not particularly limited and implements of larger size, hence greater capacity, and smaller size, hence lesser capacity, are specifically contemplated herein.

In yet a further option, the top cover may be made in a manner of a working platform 950 (see e.g., FIG. 9) so as to support the weight of one or two persons that may stand on the top as a platform by which they are elevated above the ground and may reach the tops of the bine trellises and are able to hang coir rope and otherwise construct and maintain the trellises. Moreover, the platform may be further adjustable in a vertical direction, either manually adjustable with an extendable ladder, or possibly via a hydraulically actuated scissor lift, so that the implement may be used on trellises of different heights and provide operators the ability to easily and safely reach such heights as the implement is pulled down rows. In the event a platform is included, the platform may include required railings or similar safety features about the periphery of the platform, and may further include a deflector or similar mechanism by which overhead cables, bines and the like are displaced upward and outward as the implement is pulled through a row with the platform raised. It should be further appreciated that if the top cover also serves as a platform that various safety features and interlocks may be considered whereby the picking subsystem is not operational while the cover or platform is raised, or that the platform cannot be raised when the implement is not generally in a level position, etc.

Another option contemplated is a debris grinder or mulching apparatus that me be fit to or simply pulled behind the harvester to further reduce the size of the debris and stripped bines after the hops has been harvested. Such a device would, using known technology, reduce the size of the output to those that may be easily spread and/or composted.

In recapitulation, from the foregoing it is understood that in operation the operator cinches the bine into a bine clip 110 on a bine conveyor subsystem 118 that provides a drawing force for the continuous horizontal travel of the bine 112 through a picking section of the harvester. The bine successively enters the throat or nip 910 of the primary rake assembly 114 having spring mounted rakes 136 in contact with both the top and bottom of the bine as the leaves, stems and hops are separated from the trunk. The semi-defoliated trunk progresses into the secondary rake assembly 116 where the gap between the upper and lower rakes has been reduced in order to capture the residual hops. Upon exiting, the remaining trunk is removed from the bine conveyor belt and most generally placed into a discrete shredder which may or may not be conjoined to, or powered by the harvester. The intermingled assortment of leaves, stems and hops is concurrently dropped onto mixed foliage conveyor 208, positioned just below the picking subsystem 101, which subsequently places the "debris" into the separation subsystem 400 where the hops are sectored out from the rest of the foliage by gravity through one or more inclined conveyor belts 204. The hops are further isolated on an exit conveyor 220 by a stream of directed air which ensures that only hops are placed in the bin 216. Notably, the leaves and such are encouraged to move up the inclined conveyor by applying a negative pressure through the belt of separation conveyor system 400 that is subsequently released at the upper end of the belt as the leaves are either dropped onto a successive inclined belt or in the alternative placed on an exit belt to be discarded along with the bine trunk.

It will be appreciated that several of the above-disclosed embodiments and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A portable implement for the removal of hops from a bine, comprising:
   a generally horizontal bine transport carousel extending through and outwardly from the forward and rearward ends of the implement, said carousel including at least one bine clip;
   a shroud operatively associated with at least a portion of said bine transport carousel;
   a plurality of picking rakes arranged on stripper rollers forming a picking nip region therebetween for contacting the bine and separating the hops from the bine;
   a helical bine positioning member biasing the bine toward the center of the picking nip region;
   at least one inclined separating conveyor positioned below the picking nip region, said separating conveyor having a perforated belt surface with a negative pressure applied along at least a portion thereof;
   a hops conveyor located beneath said inclined conveyor to transport hops on a surface thereof toward the rear of the implement;
   a single blower simultaneously providing negative air pressure to the separating conveyor belt and positive pressure to an end of the hops conveyor to blow and further separate debris mixed with the hops as the hops falls from the hops conveyor;
   a tow bar for connecting the implement to a vehicle for transport;
   a source of mechanical power that is distributed to at least the conveyor belts, blower and stripper rollers;
   an additional source of power for operating at least one component of the implement separate from the power take-off; and
   at least two wheels associated with said implement for the purpose of transport.

2. The implement according to claim 1 wherein said shroud is a vertical shroud interposed between said bine and the transport loop and attached to said bine transport loop.

3. The implement according to claim 1 wherein said shroud is a generally cylindrical, co-axial shroud attached near the periphery of at least one drive sprocket of said bine transport carousel.

4. The implement according to claim 1 wherein the spacing of a nip between the picking rakes on at least one pair of rolls is adjustable.

5. The implement according to claim 4 wherein the adjustment in the spacing of said nip between the picking rakes is accomplished by adjusting the position of at least an upper stripper roller.

6. The implement according to claim 1 wherein said additional source of power includes hydraulic power from the vehicle and where the implement further includes at least one hydraulic drive operatively associated with the bine transport carousel, said hydraulic drive providing a driving force to a drive sprocket where said drive sprocket in turn drives the bine transport carousel.

7. The implement according to claim 1 further including at least one bine positioning member for contacting the bine and biasing the bine toward a central region of the nip.

8. The implement according to claim 7, wherein said bine positioning member includes a rotating member having helical surfaces thereon.

9. The implement according to claim 1, wherein said at least one inclined separating conveyor is positioned at an angle of between about 30-45 degrees relative to horizontal and said negative pressure from said blower is applied from the interior to a top surface of the belt to attract stripped leaves and debris to said belt surface.

10. The implement according to claim 1, wherein said blower further provides positive air flow to assist in the segregation of the hops from debris.

11. The implement according to claim 1, wherein said source of mechanical power includes a power take-off, attached to a vehicle, said power take-off being operatively connected to a transmission to facilitate the distribution of mechanical power to the conveyor belts, blower and stripper rollers.

12. The implement according to claim 1 further including at least one working platform thereon, said platform supporting a person at a position elevated above the ground.

13. A method for the harvesting of hops including:
attaching a hop bine to a bine hook;
using said bine clip, pulling said bine into a harvester using a carousel, said carousel having a chain to move said bine clip about a continuous path, where said carousel includes a shroud to prevent the bine from becoming entangled therein;
removing leaves and hops from said bine using at least one pair of rotating stripper rollers, each of said stripper rollers including a plurality of picking rakes arranged thereon and said picking rakes forming a picking nip region between the rollers for contacting the bine and separating the hops from the bine;
collecting said hops and leaves onto a separating conveyor;
separating said hops from said leaves using gravity;
applying air pressure to further eliminate foreign matter and thereby separating the hops from leaves and other debris; and
directing the separated hops into a collection location.

14. The method according to claim 13 wherein said carousel includes a roller chain and said shroud provides a protective cover over at least a portion of the roller chain.

15. The method according to claim 13 wherein said carousel includes a drive sprocket and said shroud is coaxially attached about the periphery of said drive sprocket.

* * * * *